United States Patent [19]

Lindquist

[11] 4,243,251

[45] Jan. 6, 1981

[54] FLOOR OR ROOF DRAIN FITTING

[76] Inventor: William W. Lindquist, 190 Clarencedale Ave., Youngstown, Ohio 44512

[21] Appl. No.: 80,077

[22] Filed: Sep. 28, 1979

[51] Int. Cl.³ .............................................. F16L 5/00
[52] U.S. Cl. ........................................ 285/4; 285/42
[58] Field of Search .................... 285/4, 3, 42, 43, 44, 285/161, 159; 52/98

[56] References Cited

U.S. PATENT DOCUMENTS

| | | | |
|---|---|---|---|
| Re. 13,485 | 11/1912 | Carlson | 285/4 |
| 1,185,846 | 6/1916 | Simpson | 285/4 X |
| 1,352,248 | 9/1920 | Coar | 285/4 |
| 1,833,187 | 11/1931 | Stringer | 285/42 X |
| 2,961,914 | 11/1960 | Young | 285/161 X |
| 3,481,632 | 12/1969 | Suess | 285/42 |

FOREIGN PATENT DOCUMENTS 493320  8/1919  France ........................................ 285/4

Primary Examiner—Thomas F. Callaghan
Attorney, Agent, or Firm—Webster B. Harpman

[57] ABSTRACT

A floor or roof drain fitting includes a flanged tubular member for positioning in an opening to form a drain structure. A sleeve is engaged about the tubular member such as by threaded engagement therewith with the upper portion of the sleeve being of considerably larger diameter and provided with a plurality of circumferentially spaced finger-like sections which are frangible. Tubular members may thus be clampingly secured in an opening in a floor or roof to form a water tight drain fitting.

5 Claims, 3 Drawing Figures

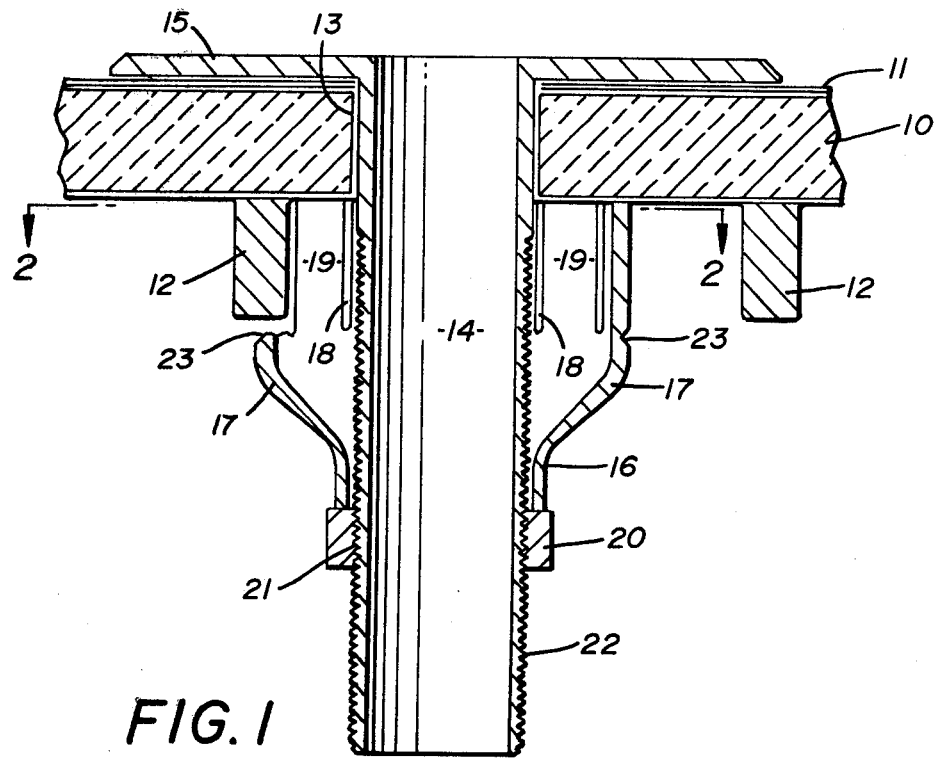
FIG. 1
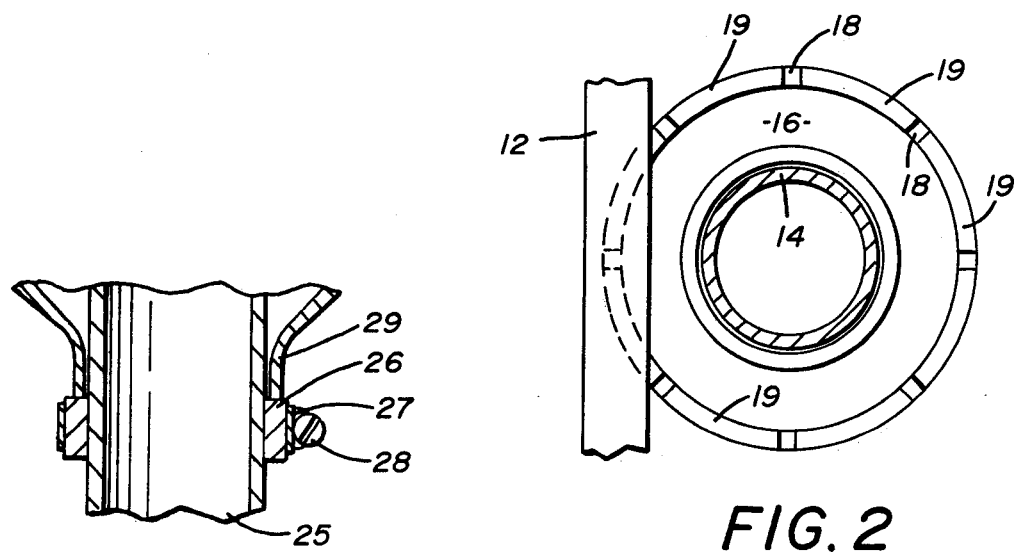
FIG. 3
FIG. 2

FLOOR OR ROOF DRAIN FITTING

BACKGROUND OF THE INVENTION (1) Field of the Invention:

This invention relates to floor or roof drain fittings by means of which liquids may be conducted through openings in the floor or roof and directed into a conductor in communication therewith.

(2) Description of the Prior Art:

A typical floor drain structure is shown in U.S. Pat. No. 3,481,632 wherein a flat plate is centrally apertured and the edges of the material about the aperture bent downwardly so as to be positioned in the upper end of a tubular member. A water sealed trap is seen in U.S. Pat. No. 1,185,846 wherein a flanged member overlies a portion of a floor and is threadably engaged in a tubular fitting positioned in the floor. Portions of the tubular fitting are capable of being broken away so as to alter the overall height thereof.

A similar flanged construction is seen in U.S. Pat. No. Re. 13,485 and a roof connection for vent pipes having angularly formed frangible guide grooves is seen in U.S. Pat. No. 1,352,248. No prior art is known wherein a flanged tubular member is of integral construction arranged to be positioned downwardly through an opening in a roof or a floor to form a drain and held in such position in water tight relation to the floor by a sleeve adjustably affixed to the tubular member and having an enlarged upper end with frangible portions which enables the sleeve to be clampingly engaged against the bottom of the floor or the roof structure regardless of intervening structures or supports, as the case may be.

SUMMARY OF THE INVENTION

A floor or roof drain fitting consists of a flanged tubular member with means on the tubular member for adjustably mounting a sleeve for movement longitudinally thereof, the upper end of the sleeve being enlarged and provided with frangible portions so that it may be engaged against the underside of the roof or floor through which the fitting is positioned to clampingly secure the fitting in water tight relation in the opening.

DESCRIPTION OF THE DRAWINGS

FIG. 1 is a cross sectional side elevation of the floor or roof drain fitting;

FIG. 2 is a horizontal section on line 2—2 of FIG. 1; and

FIG. 3 is a vertical section of a modification of the means by which the sleeve portion of the device seen in FIG. 1 may be adjustably secured to the tubular portion thereof.

DESCRIPTION OF THE PREFERRED EMBODIMENT

By referring to the drawings and FIG. 1 in particular, it will be seen that a section of a roof or a floor structure 10 is disclosed on which one or more layers of surface material 11 are positioned. Supporting members 12 are shown beneath the roof or floor structure 10 and may or may not be integrally formed therewith, as will occur to those skilled in the art.

An opening 13 is formed in the roof or floor structure 10 and a tubular member 14 having a flat outwardly extending annular flange 15 on its upper end is shown positioned in the openings 13 and extending downwardly therethrough and to a point substantially below the support members 12.

A sleeve 16, the lower end of which is of a diameter slightly larger than the outer diameter of the tubular member 14 has an upper portion of substantially larger diameter as indicated at 17 and is provided with a plurality of circumferentially spaced vertically arranged slots 18 so that in effect the uppermost portion 17 of the sleeve 16 is formed of a plurality of spaced vertically standing fingers 19. In order that the sleeve 16 and its fingers 19 may be moved upwardly against the lower surface of the roof or floor structure 10 so as to hold the flat outwardly extending annular flange 15 of the device in sealing relation against the layered surface material 11, a retaining nut 20 threaded on its interior surface as at 21 is threadably engaged on an exterior threaded surface 22 of the tubular member 14.

Still referring to FIG. 1 of the drawings, it will be seen that the sleeve 16 and its enlarged upper portion 17 with the finger-like portions 19 has been moved upwardly into tensioned engagement with the lower surface of the roof or floor structure 10 despite the presence of one of the support members 12 heretofore referred to. In order to accommodate the support member 12 to the left of FIG. 1 of the drawings, one or more of the finger-like portions 19 of the upper end 17 of the sleeve have been broken away as on frangible lines 23 which are formed on the exterior of the upper end 17 of the sleeve 16 so that appropriate finger-like portions 19 can be broken away and the sleeve positioned in engaging relation against the roof or floor structure 10 and then tensioned thereagainst by rotating the retaining nut 20 on its threaded exterior surface 22 of the tubular member 14.

In FIG. 2 of the drawings, a horizontal section on line 2—2 of Fig. 1 may be seen and it will be observed that the support member 12 to the left of the Figure passes through the area which would ordinarily be occupied by the fingers 19 and which have been broken away as seen in better detail in FIG. 1 of the drawings.

It will occur to those skilled in the art that other interfering objects may be accommodated such as pipes, conduits and the like by simply breaking away one or more of the finger-like portions of the sleeve in its upper end 17.

Modifications will occur to those skilled in the art and one such modification is illustrated in FIG. 3 of the drawings wherein a tubular portion 25 of a flanged floor or roof drain fitting is provided with a friction clamp comprises a band 26 and a metal compression clamp 27 complete with a threaded bolt 28 so that the lower end of a sleeve 29 comparable with that heretofore described and indicated by the numeral 16 can be held in tensioned engagement against the lower portion of a roof or floor structure as will be understood by those skilled in the art.

It will thus be seen that a simple, relatively inexpensive floor or roof drain fitting has been disclosed which comprises three simple, easily molded inexpensive parts which can be formed of appropriate synthetic resin material and that by reason of the arrangement and configuration the fitting may be installed in almost any location in a floor or roof structure and its clamping means readily adapted to provide clearance for supporting members, pipes, conduits or other articles.

Although but one embodiment of the present invention has been illustrated and described, it will be apparent to those skilled in the art that various changes and modifications may be made therein without departing from the spirit of the invention and having thus described my invention what I claim is:

1. A floor or roof drain fitting comprising a tubular member having a flat outwardly extending annular flange about one end thereof, a sleeve slidably disposed on said fitting in spaced relation to said flange and means on said fitting for urging said sleeve towards said flange in a clamping-like action, said sleeve having an area of enlarged diameter incorporating a plurality of circumferentially spaced slots arranged in parallel relation to said tubular member, the portions of said sleeve between said slots being adapted to be broken away so as to change the configuration of said sleeve.

2. The floor or roof drain fitting set forth in cliam 1 and wherein the exterior of said fitting has a continuous thread pattern formed thereon and said means for urging the sleeve toward said flange comprises a retaining nut threadably engaged on said thread pattern and in abutting relation to said sleeve.

3. The floor or roof drain fitting set forth in claim 1 and wherein said means on said fitting for urging said sleeve toward said flange comprises a band and a compression clamp positioned thereabout, said band abutting said sleeve.

4. The floor or roof drain fitting set forth in claim 1 and wherein said tubular member and said flat outwardly extending annular flange are an integrally molded article and wherein said sleeve and the portions thereof between said slots is an integrally molded article.

5. The floor or roof drain fitting set forth in claim 1 and wherein one end of said sleeve is of a first diameter for sliding registry with said tubular member and the other end of said sleeve is of an enlarged diameter substantially double the diameter of said one end.

* * * * *